United States Patent
Liao et al.

(10) Patent No.: US 10,247,879 B2
(45) Date of Patent: Apr. 2, 2019

(54) LIGHT GUIDE ASSEMBLY AND DISPLAY DEVICE

(71) Applicant: E Ink Holdings Inc., Hsinchu (TW)

(72) Inventors: Ching-Huan Liao, Hsinchu (TW); Hsin-Tao Huang, Hsinchu (TW); Yu-Nan Pao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/021,006

(22) Filed: Jun. 27, 2018

(65) Prior Publication Data

US 2019/0018180 A1 Jan. 17, 2019

(30) Foreign Application Priority Data

Jul. 14, 2017 (CN) .......................... 2017 1 0575511

(51) Int. Cl.
*F21V 8/00* (2006.01)
*G04B 19/30* (2006.01)

(52) U.S. Cl.
CPC ........... *G02B 6/009* (2013.01); *G02B 6/0068* (2013.01); *G04B 19/30* (2013.01)

(58) Field of Classification Search
CPC ....... G02B 6/009; G02B 6/0068; G04B 19/30
See application file for complete search history.

(56) References Cited

U.S. PATENT DOCUMENTS

| | | |
|---|---|---|
| 3,328,570 A | 6/1967 | Balchunas |
| 5,613,751 A * | 3/1997 | Parker .................. G02B 6/0018 362/23.16 |
| 5,931,555 A * | 8/1999 | Akahane .............. G02B 6/0036 349/64 |
| 7,223,009 B2 | 5/2007 | Henriet et al. |
| 8,591,090 B2 | 11/2013 | Lin |
| 2007/0035945 A1 | 2/2007 | Lu |
| 2010/0085503 A1 | 4/2010 | Kim et al. |
| 2015/0226907 A1 | 8/2015 | Hu et al. |

FOREIGN PATENT DOCUMENTS

| | | |
|---|---|---|
| JP | 08-328494 A | 12/1996 |
| TW | 200632603 A | 9/2006 |
| WO | 2017047488 A1 | 3/2017 |

OTHER PUBLICATIONS

Corresponding Taiwan office action dated Jan. 10, 2018.

* cited by examiner

*Primary Examiner* — Kevin Quarterman
(74) *Attorney, Agent, or Firm* — CKC & Partners Co., LLC

(57) ABSTRACT

A light guide assembly includes a light guide plate, at least one first light source, and at least one second light source. The light guide plate has a main body, at least one first light incident structure, and at least one second light incident structure. A center of the main body has a through hole, and a straight line passing through the through hole defines a first half part and a second half part of the main body. The first light incident structure protrudes from the first half part and extends away from the main body, and the second light incident structure protrudes from the second half part and extends away from the main body. The first light source is located on an edge of the first light incident structure. The second light source is located on an edge of the second light incident structure.

13 Claims, 5 Drawing Sheets

LIGHT GUIDE ASSEMBLY AND DISPLAY DEVICE

RELATED APPLICATIONS

This application claims priority to China Application Serial Number 201710575511.X, Jul. 14, 2017, which is herein incorporated by reference.

BACKGROUND

Field of Invention

The present invention relates to a light guide assembly and a display device having the same.

Description of Related Art

A reflective display device utilizes an incident light that irradiates a display medium layer, and the display medium layer reflects the incident light to form a reflected light to realize a display. Therefore, the reflective display device needs no backlight, which reduces power consumption. A front light module may have a light guide plate and a light source, and the incident light may be sunlight or indoor ambient light. Generally, in order to enable that the reflective display device may be used in an environment without sufficient light, the front light module is disposed above the display medium layer to provide the incident light.

For requirements in products, sometimes a through hole is formed in a specific position of the light guide plate of the front light module such that a mechanism can be conveniently disposed. For example, if the reflective display device is used in a timepiece to display, a hand and a rotating shaft can be connected with each other by utilizing the through hole. In general, the light source is located on a certain position of a lateral surface of the light guide plate. Since light transmission within the light guide plate is continuous, the through hole of the light guide plate may cause light leakage from the through hole. As a result, a light energy of the light guide plate is reduced in an area opposite the light source to form a dark band, thereby degrading optical quality.

SUMMARY

An aspect of the present invention is to provide a light guide assembly.

According to an embodiment of the present invention, a light guide assembly includes a light guide plate, at least one first light source, and at least one second light source. The light guide plate has a main body, at least one first light incident structure, and at least one second light incident structure. A center of the main body has a through hole, and a straight line passing through the through hole defines a first half part and a second half part of the main body. The first light incident structure protrudes from the first half part and extends away from the main body, and the second light incident structure protrudes from the second half part and extends away from the main body. The first light source is located on an edge of the first light incident structure and faces the main body of the light guide plate. The second light source is located on an edge of the second light incident structure and faces the main body of the light guide plate.

In one embodiment of the present invention, the number of the first light source is the same as the number of the second light source.

In one embodiment of the present invention, an included angle formed between a connection line that is between the first light incident structure and the through hole and a connection line that is between the second light incident structure and the through hole is in a range from 160 degrees to 200 degrees.

In one embodiment of the present invention, the light guide plate has a plurality of first light incident structures and second light incident structures, and the number of the first light incident structures and the second light incident structures is n, and an included angle formed between two connection lines that are respectively between one of two adjacent light incident structures and the through hole and between the other of the two adjacent light incident structures and the through hole is $(360/n)\pm 20$ degrees.

In one embodiment of the present invention, the light guide plate has a plurality of second light incident structures, and the number of the first light incident structure and the second light incident structures is n, and the number of the first light source is m, and wherein $m/(n-1)$ is an integer, and there are $m/(n-1)$ second light sources disposed on the edge of each of the second light incident structures.

In one embodiment of the present invention, two of the second light incident structures are adjacent to the first light incident structure, and an included angle $\theta$ is formed between two connection lines that are respectively between one of the two second light incident structures and the through hole and between the other of the two second light incident structures and the through hole, and is in a range from 30 degrees to 120 degrees.

In one embodiment of the present invention, an included angle $\theta$ is formed between two connection lines that are respectively between one of the two second light incident structures and the through hole and between the first light incident structure and the through hole, and is $[(360-\theta)/2] \pm 20$ degrees.

In one embodiment of the present invention, an included angle formed between two connection lines that are respectively between one of two adjacent second light incident structures and the through hole and between the other of the two adjacent second light incident structures and the through hole is $[\theta/(n-2)] \pm 20$ degrees.

In one embodiment of the present invention, the main body of the light guide plate is circular, oval, or polygonal when viewed from above.

In one embodiment of the present invention, the first light incident structure and the second light incident structure are trapezoid or rectangular when viewed from above.

In one embodiment of the present invention, the through hole is circular or polygonal when viewed from above.

In one embodiment of the present invention, the light guide assembly further includes a rotating shaft and a hand. The rotating shaft is located in the through hole. The hand is located above the main body of the light guide plate, and an end of the hand is connected to the rotating shaft.

An aspect of the present invention is to provide a display device.

According to an embodiment of the present invention, a display device includes a display panel and a light guide assembly. The light guide assembly is located on a top surface of the display panel or a bottom surface of the display panel. The light guide assembly includes a light guide plate, at least one first light source, and at least one second light source. The light guide plate has a main body, at least one first light incident structure, and at least one second light incident structure. A center of the main body has a through hole, and a straight line passing through the through hole defines a first half part and a second half part of the main body. The first light incident structure protrudes from the first half part and extends away from the main body, and the second light incident structure protrudes from the second half part and extends away from the main body. The first light source is located on an edge of the first light incident structure and faces the main body of the light guide plate. The second light source is located on an edge of the second light incident structure and faces the main body of the light guide plate.

In one embodiment of the present invention, when the light guide assembly is located on the top surface of the display panel, the display panel is a reflective display panel, and the light guide assembly is a front light module.

In one embodiment of the present invention, when the light guide assembly is located on the bottom surface of the display panel, the display panel is a liquid crystal display panel, and the light guide assembly is a backlight module.

In the aforementioned embodiments of the present invention, although the main body of the light guide plate has the through hole, a light energy of the light guide plate is not reduced in an area that is opposite a light source as in the case of a conventional design because the first light incident structure and the second incident structure respectively protrude from the first half part and the second half part of the light guide plate, and the first light source and the second light source are respectively located on an edge of the first light incident structure and an edge of the second light incident structure. In other words, the first half part and the second half part of the light guide plate can respectively receive light emitted from the first light source and the second light source, thereby reducing an effect of light leakage from the through hole. The light guide assembly can form a surface light source with uniform light and prevents a dark band, thereby improving optical quality of the light guide plate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
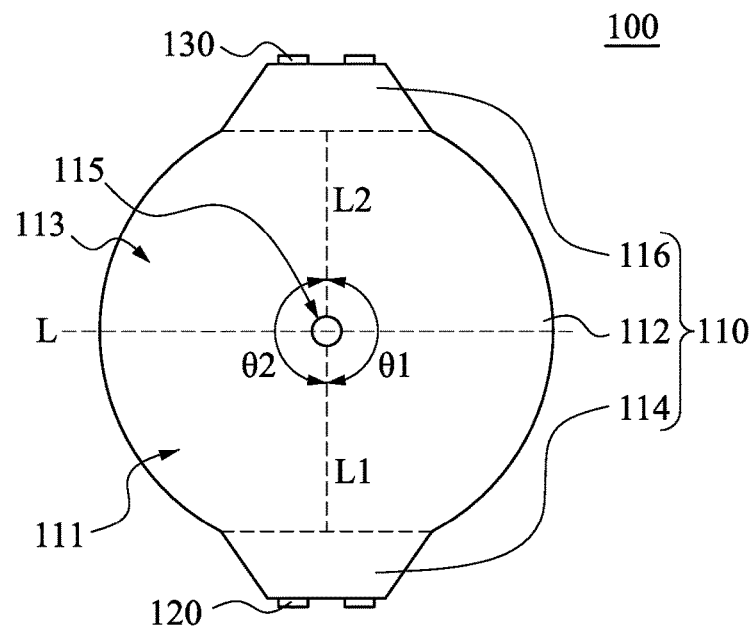
FIG. 1 is a top view of a light guide assembly according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a top view of a light guide assembly 100 according to one embodiment of the present invention. As shown in FIG. 1, the light guide assembly 100 includes a light guide plate 110, at least one first light source 120, and at least one second light source 130. The light guide plate 110 has a main body 112, at least one first light incident structure 114, and at least one second light incident structure 116. A center of the main body 112 has a through hole 115, and a straight line L passing through the through hole 115 defines a first half part 111 (e.g., a lower half part) and a second half part 113 (e.g., an upper half part) of the main body 112. The first light incident structure 114 protrudes from the first half part 111 and extends away from the main body 112, and the second light incident structure 116 protrudes from the second half part 113 and extends away from the main body 112. The first light source 120 is located on an edge of the first light incident structure 114 and faces the main body 112 of the light guide plate 110. The second light source 130 is located on an edge of the second light incident structure 116 and faces the main body 112 of the light guide plate 110.

When the light guide plate 110 is irradiated by the first light source 120 and the second light source 130, although the main body 112 of the light guide plate 110 has the through hole 115, a light energy of the light guide plate 110 is not reduced in an area that is opposite a light source as in the case of a conventional design because the first light incident structure 114 and the second incident structure 116 respectively protrude from the first half part 111 and the second half part 113 of the light guide plate 110, and the first light source 120 and the second light source 130 are respectively located on the edge of the first light incident structure 114 and the edge of the second light incident structure 116. In other words, the first half part 111 and the second half part 113 of the light guide plate 110 can respectively receive light emitted from the first light source 120 and the second light source 130, thereby reducing an effect of light leakage from the through hole 115. As a result, the light guide assembly 100 can form a surface light source with uniform light and prevents a dark band, thereby improving optical quality of the light guide plate 110.

In this embodiment, the number of the first light sources 120 is the same as the number of the second light sources 130, in which the aforementioned numbers both are two. An included angle $\theta1$ or $\theta2$ formed between a connection line L1 that is between the first light incident structure 114 and the through hole 115 and a connection line L2 that is between the second light incident structure 116 and the through hole 115 is in a range from 160 degrees to 200 degrees. For example, if the included angle $\theta1$ is 160 degrees, the included angle $\theta2$ is 200 degrees; if the included angle $\theta1$ is 180 degrees, the included angle $\theta2$ is 180 degrees. The number of the first light incident structures 114 and the second light incident structures 116 is n, and the included angle $\theta1$ is $(360/n)\pm20$ degrees, and the included angle $\theta2$ is $(360/n)\pm20$ degrees. In this embodiment, n is equal to 2.

In this embodiment, the main body 112 of the light guide plate 110 may be circular or oval when viewed from above, and the first light incident structure 114 and the second light incident structure 116 of the light guide plate 110 may be trapezoid when viewed from above, and the through hole 115 may be circular or polygonal when viewed from above, but the present invention is not limited in this regard.

Figure 2:
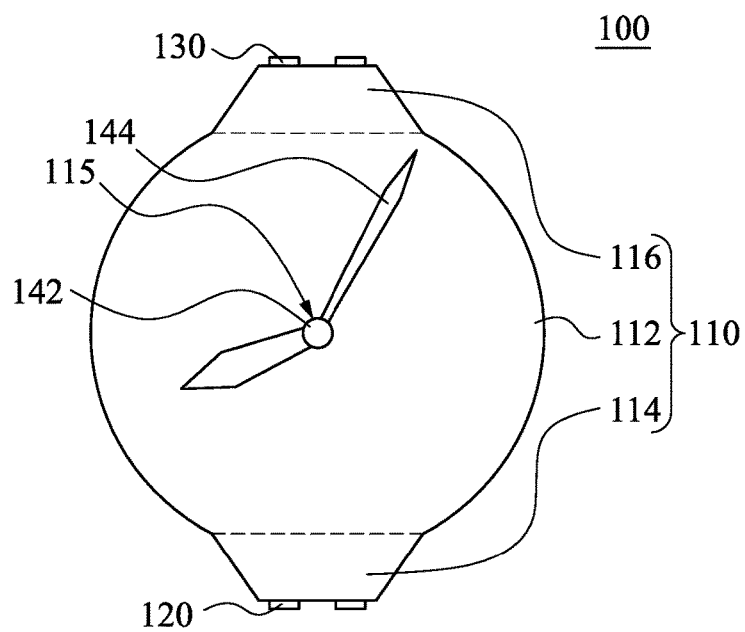
FIG. 2 is a top view of the light guide assembly shown in FIG. 1 on which a rotating shaft and a hand are disposed.

FIG. 2 is a top view of the light guide assembly 100 shown in FIG. 1 on which a rotating shaft 142 and a hand 144 are disposed. The light guide assembly 100 may further include the rotating shaft 142 and the hand 144. The hand 144 may be an hour hand, a minute hand, or a second hand, and the present invention is not limited in this regard. The rotating shaft 142 is located in the through hole 115 of the light guide plate 110. An end of the hand 144 is connected to the rotating shaft 142, and the hand 144 is located above the main body 112 of the light guide plate 110. Moreover, the rotating shaft 142 and the hand 144 can also be disposed in structures of FIGS. 3 to 9.

It is to be noted that the connection relationships and advantages of the elements described above will not be repeated hereinafter, and other types of light guide assemblies will be described.

Figure 3:
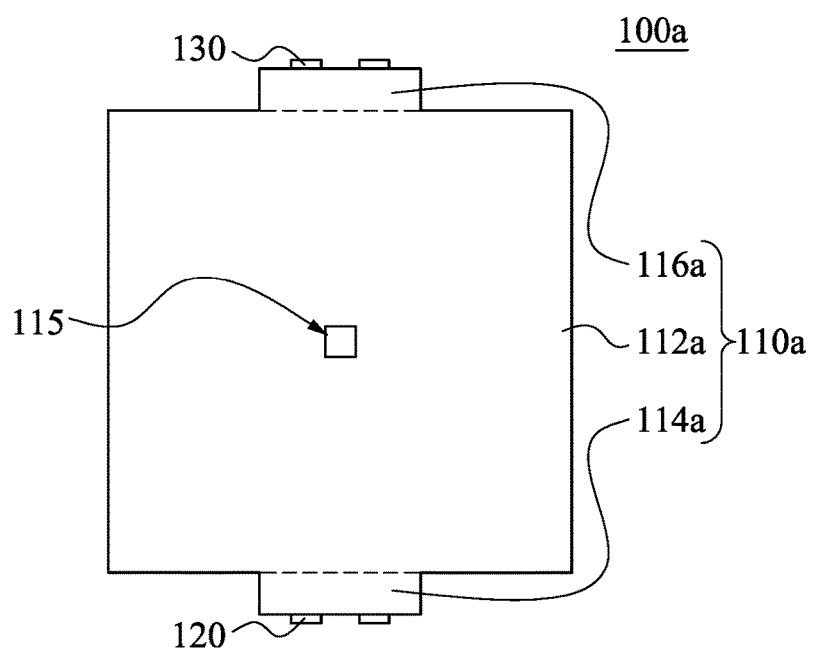
FIG. 3 is a top view of a light guide assembly according to one embodiment of the present invention.

FIG. 3 is a top view of a light guide assembly 100a according to one embodiment of the present invention. The light guide assembly 100a includes a light guide plate 110a, at least one first light source 120, and at least one second light source 130. The difference between this embodiment and the embodiment shown in FIG. 1 is that a main body 112a of the light guide plate 110a is polygonal when viewed from above, and a first light incident structure 114a and a second light incident structure 116a are rectangular when viewed from above, and a through hole 115a is rectangular when viewed from above. In this embodiment, each of the main body 112a and the through hole 115a is square.

Figure 4:
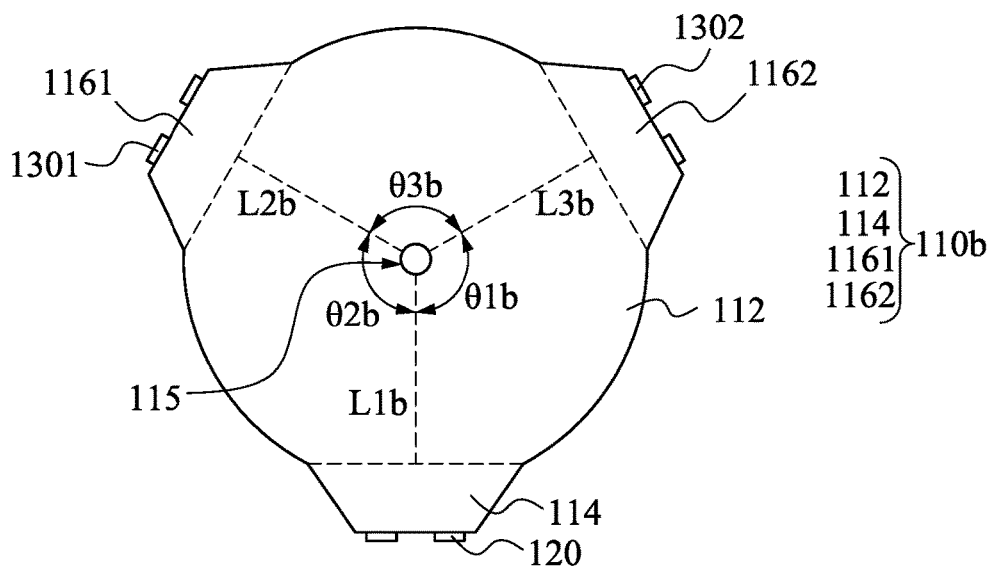
FIG. 4 is a top view of a light guide assembly according to one embodiment of the present invention.

FIG. 4 is a top view of a light guide assembly 100b according to one embodiment of the present invention. The light guide assembly 100b includes a light guide plate 110b, the first light sources 120, second light sources 1301, and third light sources 1302. The number of the first light sources 120, the number of the second light sources 1301, and the number of the third light sources 1302 are the same, in which each of the aforementioned numbers is two. The light guide plate 110b has the main body 112, the first light incident structure 114, a second light incident structure 1161, and a third light incident structure 1162. The number of the first light incident structure 114, the second light incident structure 1161, and the third light incident structure 1162 is n. An included angle θ3b formed between two connection lines L2b and L3b that are respectively between one of two adjacent second and third light incident structures 1161 and 1162 and the through hole 115 and between the other of the two adjacent second and third light incident structures 1161 and 1162 and the through hole 115, an included angle θ2b formed between two connection lines L1b and L2b that are respectively between one of two adjacent first and second light incident structures 114 and 1161 and the through hole 115 and between the other of the two adjacent first and second light incident structures 114 and 1161 and the through hole 115, and an included angle θ1b formed between two connection lines L1b and L3b that are respectively between one of two adjacent first and third light incident structures 114 and 1162 and the through hole 115 and between the other of the two adjacent first and third light incident structures 114 and 1162 and the through hole 115 are (360/n)±20 degrees. In this embodiment, n is equal to 3.

Figure 5:
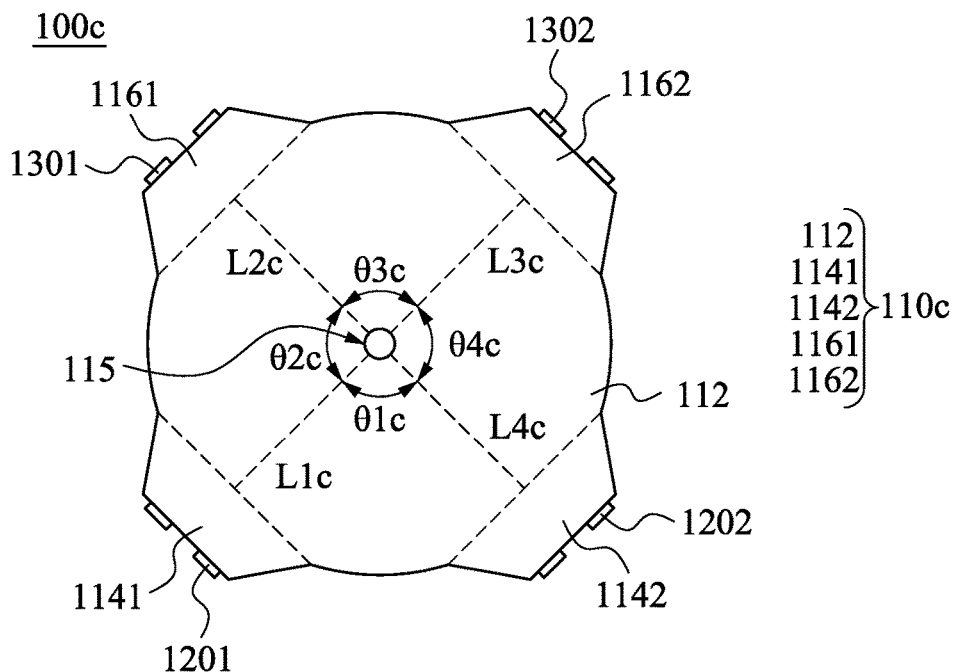
FIG. 5 is a top view of a light guide assembly according to one embodiment of the present invention.

FIG. 5 is a top view of a light guide assembly 100c according to one embodiment of the present invention. The light guide assembly 100c includes a light guide plate 110c, first light sources 1201, second light sources 1202, third light sources 1301, and fourth light sources 1302. The number of the first light sources 1201, the number of the second light sources 1202, the number of the third light sources 1301, and the number of the fourth light sources 1302 are the same, in which each of the aforementioned numbers is two, but the present invention is not limited in this regard. The light guide plate 110c has the main body 112, a first light incident structure 1141, a second light incident structure 1142, a third light incident structure 1161, and a fourth light incident structure 1162. The number of the aforementioned light incident structures is n. An included angle θ1c formed between two connection lines L1c and L4c that are respectively between one of two adjacent first and second light incident structures 1141 and 1142 and the through hole 115 and between the other of the two adjacent first and second light incident structures 1141 and 1142 and the through hole 115, an included angle θ3c formed between two connection lines L2c and L3c that are respectively between one of two adjacent third and fourth light incident structures 1161 and 1162 and the through hole 115 and between the other of the two adjacent third and fourth light incident structures 1161 and 1162 and the through hole 115, an included angle θ2c formed between two connection lines L1c and L2c that are respectively between one of two adjacent first and third light incident structures 1141 and 1161 and the through hole 115 and between the other of the two adjacent first and third light incident structures 1141 and 1161 and the through hole 115, and an included angle θ4c formed between two connection lines L4c and L3c that are respectively between one of two adjacent second and fourth light incident structures 1142 and 1162 and the through hole 115 and between the other of the two adjacent second and fourth light incident structures 1142 and 1162 and the through hole 115 are (360/n)±20 degrees. In this embodiment, n is equal to 4.

Figure 6:
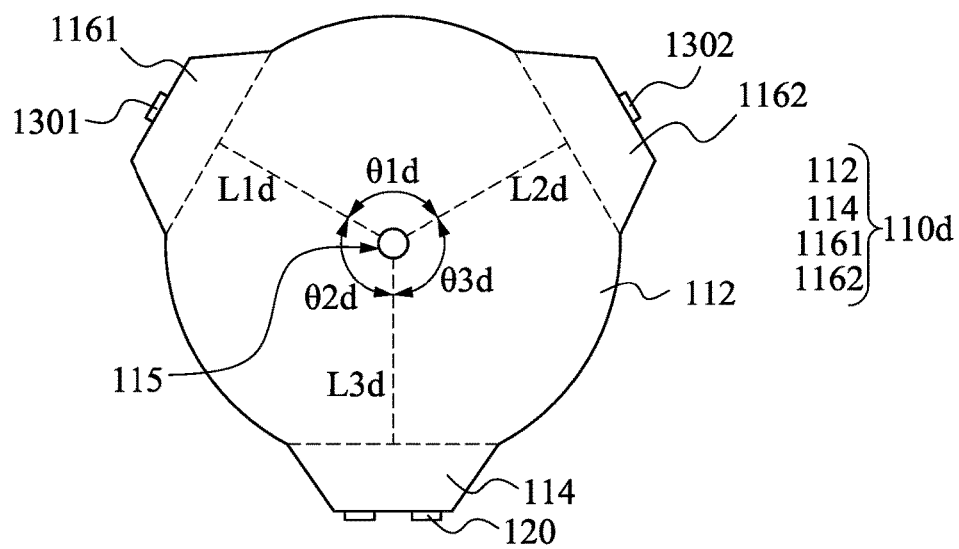
FIG. 6 is a top view of a light guide assembly according to one embodiment of the present invention.

FIG. 6 is a top view of a light guide assembly 100d according to one embodiment of the present invention. The light guide assembly 100d includes a light guide plate 110d, the first light sources 120, a second light source 1301, and a third light source 1302. The light guide plate 110d has the main body 112, the first light incident structure 114, a second light incident structure 1161, and a third light incident structure 1162. The number of the first light incident structure 114, the second light incident structure 1161, and the third light incident structure 1162 is n, and the number of the first light sources 120 is m, and m/(n−1) is an integer. There are m/(n−1) second light sources 1301 disposed on an edge of the second light incident structure 1161, and there are m/(n−1) third light sources 1302 disposed on an edge of the third light incident structure 1162. In this embodiment, n is equal to 3, and m is equal to 2.

In addition, the second light incident structure 1161 and the third light incident structure 1162 are adjacent to the first light incident structure 114. An included angle θ1d formed between two connection lines L1d and L2d that are respectively between the second light incident structure 1161 and the through hole 115 and between the third light incident structure 1162 and the through hole 115 is in a range from 30 degrees to 120 degrees. An included angle θ2d formed between two connection lines L1d and L3d that are respectively between the second light incident structure 1161 and the through hole 115 and between the first light incident structure 114 and the through hole 115 is [(360−θ1d)/2]±20 degrees, and an included angle θ3d formed between two connection lines L2d and L3d that are respectively between the third light incident structure 1162 and the through hole 115 and between the first light incident structure 114 and the through hole 115 is [(360−θ1d)/2]±20 degrees, too.

Figure 7:
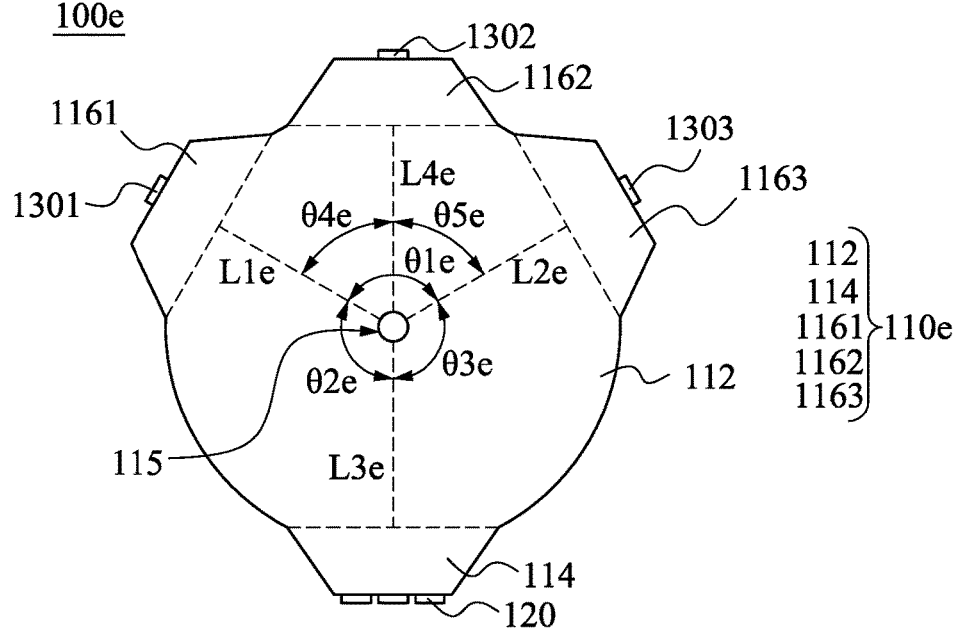
FIG. 7 is a top view of a light guide assembly according to one embodiment of the present invention.

FIG. 7 is a top view of a light guide assembly 100e according to one embodiment of the present invention. The light guide assembly 100e includes a light guide plate 110e, the first light sources 120, the second light source 1301, the third light source 1302, and a fourth light source 1303. The light guide plate 110e has the main body 112, the first light incident structure 114, the second light incident structure 1161, the third light incident structure 1162, and a fourth light incident structure 1163. The number of the aforementioned light incident structures is n, and the number of the first light sources 120 is m, and m/(n−1) is an integer. There are m/(n−1) second light sources 1301 disposed on an edge of the second light incident structure 1161, and there are m/(n−1) third light sources 1302 disposed on an edge of the third light incident structure 1162, and there are m/(n−1) fourth light sources 1303 disposed on an edge of the fourth light incident structure 1163. In this embodiment, n is equal to 4, and m is equal to 3.

In addition, the second light incident structure 1161 and the fourth light incident structure 1163 are adjacent to the first light incident structure 114. An included angle θ1e formed between two connection lines L1e and L2e that are respectively between the second light incident structure 1161 and the through hole 115 and between the fourth light incident structure 1163 and the through hole 115 is in a range from 30 degrees to 120 degrees. An included angle θ2e formed between two connection lines L1e and L3e that are respectively between the second light incident structure 1161 and the through hole 115 and between the first light incident structure 114 and the through hole 115 is [(360−θ1e)/2]±20 degrees, and an included angle θ3e formed between two connection lines L2e and L3e that are respectively between the fourth light incident structure 1163 and the through hole 115 and between the first light incident structure 114 and the through hole 115 is [(360−θ1e)/2]±20 degrees, too.

In this embodiment, an included angle θ4e formed between two connection lines L1e and L4e that are respectively between one of two adjacent second and third light incident structures 1161 and 1162 and the through hole 115 and between the other of the two adjacent second and third light incident structures 1161 and 1162 and the through hole 115 is [θ1e/(n−2)]±20 degrees, and an included angle θ5e formed between two connection lines L4e and L2e that are respectively between one of two adjacent third and fourth light incident structures 1162 and 1163 and the through hole 115 and between the other of the two adjacent third and fourth light incident structures 1162 and 1163 and the through hole 115 is [θ1e/(n−2)]±20 degrees. In this embodiment, n is equal to 4.

Figure 8:
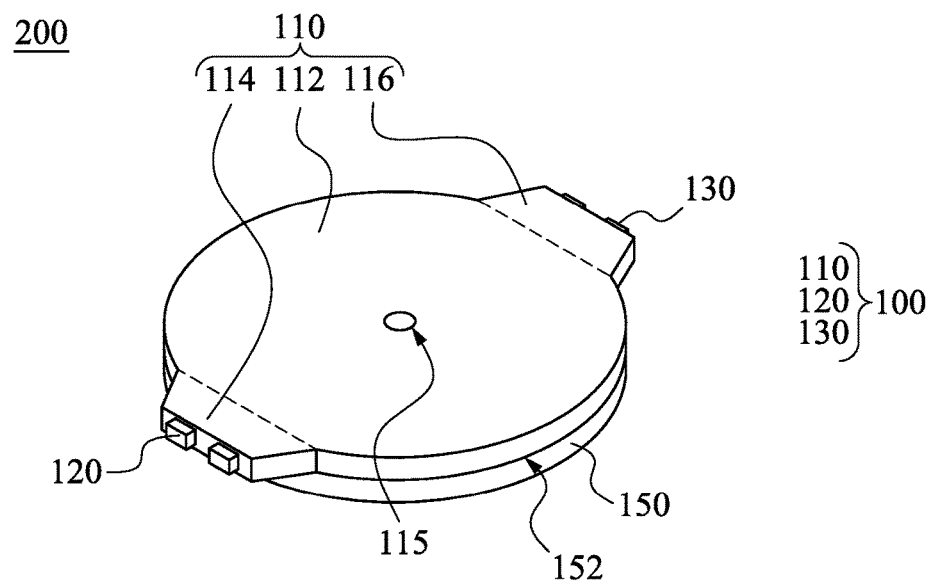
FIG. 8 is a top view of a display device according to one embodiment of the present invention.

FIG. 8 is a top view of a display device 200 according to one embodiment of the present invention. The display device 200 includes a display panel 150 and the light guide assembly 100 of FIG. 1. The light guide assembly 100 is located on a top surface 152 of the display panel 150. In this embodiment, the display panel 150 may be a reflective display panel, and the light guide assembly 100 may be a front light module. In use, the light guide assembly 100 can provide incident light to the display panel 150.

In alternative embodiments, the light guide assembly 100 of FIG. 8 may be replaced with one of the light guide assemblies 100a-100e that are respectively shown in FIGS. 3 to 7 as deemed necessary by designers.

Figure 9:
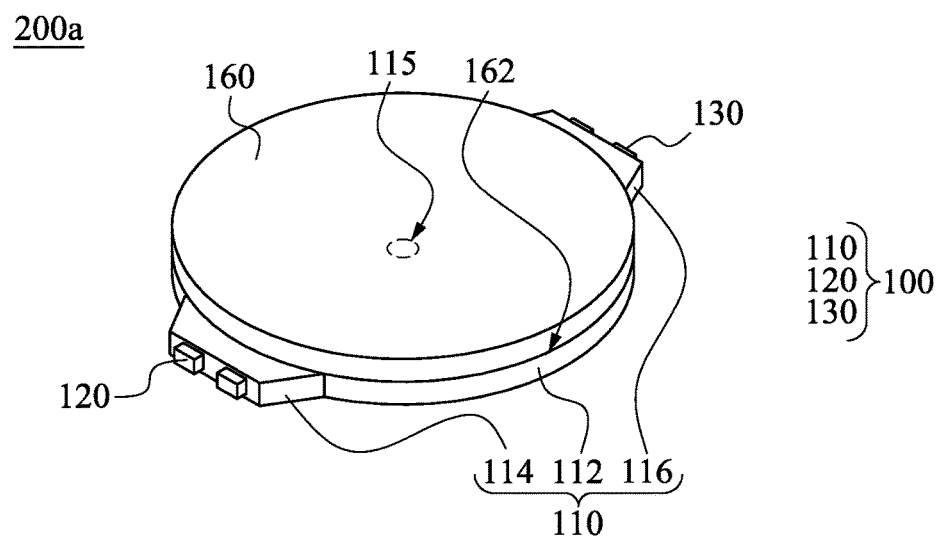
FIG. 9 is a top view of a display device according to one embodiment of the present invention.

FIG. 9 is a top view of a display device 200a according to one embodiment of the present invention. The display device 200a includes a display panel 160 and the light guide assembly 100 of FIG. 1. The light guide assembly 100 is located on a bottom surface 162 of the display panel 160. In this embodiment, the display panel 160 may be a liquid crystal display panel, and the light guide assembly 100 may be a backlight module. In use, the light guide assembly 100 can provide back light to the display panel 160.

In alternative embodiments, the light guide assembly 100 of FIG. 9 may be replaced with one of the light guide assemblies 100a-100e that are respectively shown in FIGS. 3 to 7 as deemed necessary by designers.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A light guide assembly, comprising:
a light guide plate having a main body, at least one first light incident structure, and a plurality of second light incident structures, wherein a center of the main body has a through hole, and a straight line passing through the through hole defines a first half part and a second half part of the main body, and wherein the first light incident structure protrudes from the first half part and extends away from the main body, and the second light incident structures protrude from the second half part and extends away from the main body;
m numbers of first light source located on an edge of the first light incident structure and facing the main body of the light guide plate, wherein the number of the first light incident structure and the second light incident structures is n, and the number of the first light source is m, and wherein m/(n−1) is an integer; and
a plurality of second light sources located on edges of the second light incident structures and facing the main body of the light guide plate, wherein there are m/(n−1) second light sources disposed on the edge of each of the second light incident structures.

2. The light guide assembly of claim 1, wherein the number of the first light source is the same as the number of the second light sources.

3. The light guide assembly of claim 1, wherein the light guide plate has a plurality of first light incident structures and second light incident structures, and the number of the first light incident structures and the second light incident structures is n, and an included angle formed between two connection lines that are respectively between one of two adjacent light incident structures and the through hole and between the other of the two adjacent light incident structures and the through hole is (360/n)±20 degrees.

4. The light guide assembly of claim 1, wherein two of the second light incident structures are adjacent to the first light incident structure, and an included angle θ is formed between two connection lines that are respectively between one of the two second light incident structures and the through hole and between the other of the two second light incident structures and the through hole, and is in a range from 30 degrees to 120 degrees.

5. The light guide assembly of claim 4, wherein an included angle θ is formed between two connection lines that are respectively between one of the two second light incident structures and the through hole and between the first light incident structure and the through hole, and is [(360−θ)/2]±20 degrees.

6. The light guide assembly of claim 4, wherein an included angle formed between two connection lines that are respectively between one of two adjacent second light incident structures and the through hole and between the other of the two adjacent second light incident structures and the through hole is [θ/(n−2)]±20 degrees.

7. The light guide assembly of claim 1, wherein the main body of the light guide plate is circular, oval, or polygonal when viewed from above.

8. The light guide assembly of claim 1, wherein the first light incident structure and the second light incident structures are trapezoid or rectangular when viewed from above.

9. The light guide assembly of claim 1, wherein the through hole is circular or polygonal when viewed from above.

10. The light guide assembly of claim 1, further comprising:
   a rotating shaft located in the through hole; and
   a hand located above the main body of the light guide plate, wherein an end of the hand is connected to the rotating shaft.

11. A display device, comprising:
   a display panel; and
   a light guide assembly located on a top surface of the display panel or a bottom surface of the display panel, the light guide assembly comprising:
      a light guide plate having a main body, at least one first light incident structure, and a plurality of second light incident structures, wherein a center of the main body has a through hole, and a straight line passing through the through hole defines a first half part and a second half part of the main body, and wherein the first light incident structure protrudes from the first half part and extends away from the main body, and the second light incident structures protrude from the second half part and extends away from the main body;
      m numbers of first light source located on an edge of the first light incident structure and facing the main body of the light guide plate, wherein the number of the first light incident structure and the second light incident structures is n, and the number of the first light source is m, and wherein m/(n−1) is an integer; and
      a plurality of second light sources located on edges of the second light incident structures and facing the main body of the light guide plate, wherein there are m/(n−1) second light sources disposed on the edge of each of the second light incident structures.

12. The display device of claim 11, wherein when the light guide assembly is located on the top surface of the display panel, the display panel is a reflective display panel, and the light guide assembly is a front light module.

13. The display device of claim 11, wherein when the light guide assembly is located on the bottom surface of the display panel, the display panel is a liquid crystal display panel, and the light guide assembly is a backlight module.

* * * * *